Oct. 14, 1941.   W. L. WAGGONER   2,259,093
SUPPLY BIN
Filed Oct. 6, 1939
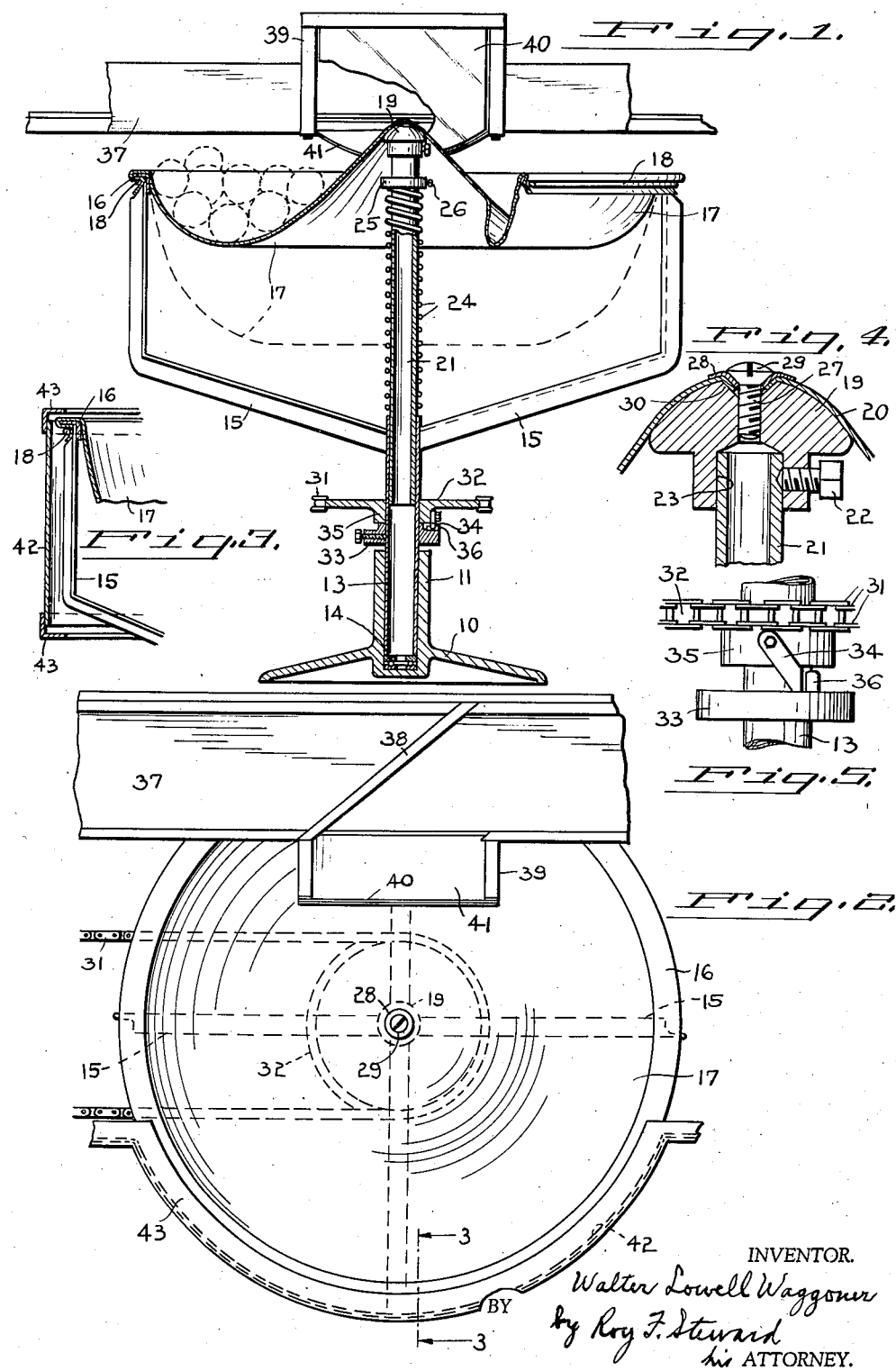
INVENTOR.
Walter Lowell Waggoner
BY Roy F. Steward
his ATTORNEY.

Patented Oct. 14, 1941

2,259,093

UNITED STATES PATENT OFFICE 2,259,093

SUPPLY BIN

Walter Lowell Waggoner, Wenatchee, Wash., assignor to Brogdex Company, Pomona, Calif., a corporation of Florida Application October 6, 1939, Serial No. 298,341

7 Claims. (Cl. 226—129)

This invention relates to supply bins of the type employed in fruit packing houses.

In such packing houses it is customary to employ grading machines which separate and distribute the articles in differing sizes, each size being discharged separately preparatory to packing such articles in shipping containers such as boxes or baskets, either wrapped, as, for example, in paper, or unwrapped. Owing to fluctuations in the rate of discharge of articles of any given size from the grading machines, it is customary to provide a device serving as a reservoir to receive the articles of one size as they are discharged from the grading machine, and thereby accumulate and maintain a supply of such articles, so that an operative packaging the articles may be kept supplied with such articles, at least to a reasonable extent, notwithstanding fluctuations in the discharge from the grading machine of articles of the predetermined size. Such a device for accumulating the articles of one size and thereby providing a supply for the operative, has been designated a supply bin.

From such a supply bin the operative removes the articles by hand and deposits them in a shipping container or the like. With some articles, for example citrus fruit, it is customary to wrap each article in paper and this makes it convenient for the operative to work in a seated position at a table adjacent to the supply bin. Under such circumstances it is important and aids greatly in efficiency to maintain the supply of articles in the supply bin within convenient reach of the operative.

While supply bins have heretofore been in general use for the purposes above described, there has not been a supply bin, prior to the present invention, which would always maintain, with certainty and regularity, a supply of articles close to the periphery of the bin, with the result that with such prior bins it was necessary at times for the operative to reach toward the center of the bin varying distances in order to grasp and remove an article, thereby necessitating a certain amount of continual and fatiguing attention on the part of such operative to look for and select the next article to be withdrawn from the supply bin.

An important object of the present invention is to provide a supply bin which will continuously maintain within easy reach of the operative a sufficient supply of articles so that reaching for and removing an article will, as a matter of practice become purely mechanical and, hence, permit the work to be carried out with the minimum of attention, so far as selecting and removing an article is concerned, and, hence, with a maximum of efficiency.

Another important object of the invention is to reduce to a minimum the chances of bruising the articles. This is particularly important with easily bruised articles such as citrus fruit, tomatoes, apples, pears, and the like, which if bruised are more likely to decay after packaging.

With the above principal objects in view and some others which will appear from the description hereinafter given, the invention, basically considered, comprises a bin in the form of a bag of flexible material such as cloth of any suitable kind, rubber fabric, or the like, means for holding the outer margin of the bag at a predetermined level, so as to suspend the bag, and variable means for elevating or lowering a central portion of the bag with relation to the said level of the margin of the bag. In the maximum raised position of the said central portion, such central portion partakes of the nature of a cone projecting upward from the bin.

In the best embodiment of the invention, the bin is rotary about a vertical axis, the means for elevating or lowering a central portion of the bag is automatic, and the amount of such change in height relative to the predetermined level of the outer margin of the bag is a function of the corresponding change in weight, and consequently of the change in number, of the articles in the bin.

Also, in the best embodiment of the invention, the bag is bowl-shaped, that is to say, is relatively shallow compared with its maximum diameter at the top, the diameters at the lower levels reducing gradually, so that the side wall will, to a certain extent, slope upward and outward from the lowest portion of the bag, whereby, when the bag is suspended wholly by its upper margin, any fruit or other article contained in the bag can be kept out of contact with any rigid part of the framework supporting the bin. That is to say, the side wall of the bag need not be truly vertical, particularly where the supporting frame is arranged directly under the supporting ring which suspends the bag.

A further feature of the invention comprises a feed or delivery chute device for depositing articles in the bin in such a manner as to avoid bruising or chafing them.

The invention will now be more specifically described in connection with the accompanying drawing illustrating the best embodiment of the invention.

In the drawing—

Fig. 1 is a vertical section through an embodiment of the invention;

Fig. 2 is a plan view of said embodiment;

Fig. 3 is a fragmentary vertical section on line 3—3, Fig. 2, through a front portion thereof showing the guard structure;

Fig. 4 is a detail in vertical section showing the thrust head construction; and Fig. 5 is a detail elevation of the drive arrangement.

Referring to the drawing, the apparatus shown comprises the bin, hopper, or bag 17, means for suspending it by its outer margin, (including a ring 16), and a central spring-pressed plunger for pushing upward at about the center of the bag.

The bag is shown in two positions, namely, in dotted lines, about as it would be when at its extreme lowermost position, and, in solid lines, in section, at one of its raised positions, it being understood, however, that it may be raised at the center still higher than is shown whereby there will be formed a narrow annular trough at the periphery, just sufficient for one circular row of oranges.

It is to be noted that the change of the bag from its lowest position, about as indicated in dotted lines, to a raised position, such as is indicated in full lines, involves a certain folding or plaiting of the material at the raised central portion, in a general vertical direction, because the circumference at a given level of the generally conical or conoidal raised portion will be somewhat less than that of the same material when flatter, as when the bag is in a lower position. Such folding or plaiting takes place automatically on elevating the central portion of the bag and causes no difficulty. The greatest amount of such folding is at the upper part of the conoidal central portion when the latter is raised above the level of the margin of the bag, and hence is not in contact with the articles contained in the bin.

Because the bag is suspended by its margin, a slight amount of sway of its side wall may occur, and this has the advantage that such wall will yield slightly and, hence, cannot injure an article such as fruit, as would be the case with a stiff, solid wall, such as one of metal.

With a rotary bin of the type described, there will be always a ring of articles at the periphery of the bin, in position to be removed by the operative, and as these are removed, their places will be filled by other articles moving in a general radial direction from the inner part of the bin, this movement being ensured by the raising of the center of the bag as the load in the bag is reduced, which raising, in the best embodiment of the invention, will be done automatically.

The bowl-shaped formation of the bag is particularly advantageous as aiding in the tendency of the articles to move toward the lowest part of the bag, and the raising of the central portion serves to shift this lowest portion toward the periphery of the bag.

While the means for suspending the bag and for raising and lowering its central portion may be of various constructions, in the best embodiment of the invention, the means for suspending the bag comprises a circular ring supported from below on a stand, as more fully described hereinafter, and the means for raising and lowering the central portion of the bag also is located below it and operates to raise such central portion by an upward push, such construction avoiding the use of overhead mechanism which might be in the way and perhaps interfere to a slight extent with the freedom of action of the operatives, although such overhead or suspension means for elevating and lowering the central portion of the bag may be employed in some cases.

In the illustrated embodiment of the invention, there is provided a base 10 having a standard 11, provided with a vertical bore, serving as a bearing for a vertical tubular arbor 13 which rests on a thrust-bearing such as the ball-bearing indicated at 14. The arbor 13 carries a plurality of arms 15 whose upper ends extend vertically and support a ring 16 which advantageously is of L-shaped section, with a horizontal portion resting on the ends of the arms and with a vertical portion extending downward inside and in contact with the inner edges of the arms 15. The downward-extending portion may be suitably secured to the respective arms as by screws or rivets. In the example shown, the ring 16 and the arms 15 are constructed of angle-iron.

The outer margin of the bag may be secured to the ring 16 in any suitable manner, but for the purpose of permitting ready removal and replacement of bags, the margin of the bag is arranged to pass over the ring 16, and downwardly across the outer face of said ring, where it is detachably secured by a clamping ring 18, which is expansible to permit ready mounting and removal. In practice it may be formed of spring metal with separable ends. In some cases, for the sake of additional security, these ends may be held together in any suitable way. The clamping ring 18 fits into the angle of ring 16, the upper portions of the outwardly extending flanges of arm 15 being cut away at an angle to provide clearance space and support for said ring 18, thereby getting a tight, positive clamping arrangement for the margins of the bags 17. It will be noted that the bag constitutes the hopper of the supply bin. When the bottom of the bag is in its lowermost position, the hopper capacity is such as to contain the maximum quantity of fruit which is intended to be received by the hopper at any one time. In normal operation, as hereinbefore indicated, the bag will have the central portion extended above the level of the supporting ring for the bag so that the fruit is held in an annular trough generally close to the margin of the bag. Sometimes, on account of the variations in feed of the fruit to the supply bin, an operator may turn to work at some other supply bin and during his absence the fruit fed to the first-mentioned supply hopper may accumulate therein to a considerable extent. It is therefore necessary to have the capacity of the bag or hopper of the supply bin sufficient to receive and retain a considerable maximum amount of fruit. The bag of the present invention conveniently supplies this additional capacity merely by the falling of the bottom portion of the bag toward its lowest position, as the weight of the fruit increases.

In the best embodiment of the invention, the frame arms 15 extend first downward and then radially inward, the proportions being such that the radially-extending parts of the arms will be below the lowermost portion of the bag when lowered to the maximum extent to give the maximum capacity of the hopper. Owing to the bowl-shape of the bag, the side walls thereof will not contact with the vertical portions of the supporting arm. As a consequence of the construc tion, some swaying of the bag, or of portions of the walls thereof, brought about by the entrance of the fruit into the bag, or otherwise, is permissible and without danger of injury to the fruit from striking the bag against unyielding members of the frame, as would occur if the bag touched the supporting arms.

A suitable arrangement is provided for adjusting the elevation of the central portion of the bag 17 to vary the capacity of the bin in accordance with the quantity of fruit therein. Such arrangement advantageously includes resilient means applying an upward thrust to a portion of the bag-bottom within the projected area of the margin of the bag which will hereinafter be referred to as a central portion of the bag-bottom. The said resilient means is so constructed and dimensioned that it will be responsive to the total weight of articles in the bin and thereby will automatically vary the elevation of that portion of the bag-bottom on which it exerts its upward thrust. In the best form now contemplated this is accomplished by providing resilient means located beneath the bin and engaging the central portion thereof. The illustrated embodiment includes thrust head 19 having an upper face 20 engaging the central portion of bag 17, this face 20 being suitably contoured to provide a smooth curving surface engaging the center of the bag 17. Said head is mounted on the upper end of a thrust rod 21, which may be hollow and detachably connected to the head 19 by set screw 22 extending into a central socket 23 for the upper end of rod 21. The lower portion of rod 21 is vertically slidable in sleeve 13, and is urged upwardly by suitable spring means, such as coil spring 24 encircling rod 21, bearing against the upper end of sleeve 13 and against a thrust collar 25 held in vertically adjustable position on rod 21 by set screw 26.

The central portion of bag 17 is advantageously connected to thrust head 19, the illustrated embodiment including a clamping screw 27 passing through the fabric of the bag and threaded into head 19. A clamping washer 28 on screw 27 holds the fabric 17 firmly against head 19, and is advantageously provided with a downwardly tapering central portion fitting against a similarly tapering lower face of rounded screw head 29, clamping the inner or central portion of the bag 17 against the face of a similarly tapered countersink or depression 30 in head 19. The parts are arranged and contoured so that when screw 27 is in place, the exposed upper surfaces of screw head 29, washer 28 and adjacent parts of bag 17, present a generally smooth curved contour that will not damage the fruit.

Suitable means is provided for rotating the bin; and it is advantageous to provide likewise an arrangement which will permit manual rotation of the bin independently of the drive mechanism to allow the operator to gain access to any desired portion of the bin. A suitable structure for this purpose is disclosed, and includes a sprocket chain 31 driven from any suitable source, not disclosed, and trained around a sprocket 32 rotatably mounted on sleeve 13 and provided with a clutch drive connection engaging a flange 33 fixed to sleeve 13 below the sprocket 32. Said connection, as shown, includes a pawl 34 pivoted on hub 35 of sprocket 32 and engaging a lug 36 on flange 33.

Bins of this type are ordinarily fed from a suitable trough, chute or the like, which may, for instance, be a discharge chute from fruit grading or sorting apparatus. A chute 37 of this type is conventionally indicated in the drawing, and extends across the rear portion of bag 17. A deflector 38 removably mounted in chute 37 serves to direct fruit into a feed spout 39 opening from the side of chute 37, advantageously provided with a flexible vertical flap 40 depending across the discharge opening of spout 39 to check the velocity of the fruit, and a downwardly inclined discharge lip 41 of flexible material such as woven fabric, which will not injure fruit coming in contact therewith.

Suitable guard or shield means will normally be provided in the fruit removal zone where the operator stands, and may include a curved vertical guard plate 42 adjacent the path of arms 15 at the front of the machine and mounted at its edges on curved angle iron guard frame members 43, the upper member 43 being arranged with an inner flange overlapping and closely adjacent to the upper face of the bin rim 16 and the bag fabric superposed thereon. The guard frame is mounted in fixed position by suitable connections to supports or other parts of the apparatus, not shown.

In operation the fruit fed along chute 37 and through spout 39 is projected into bag 17 without shock or danger of injury, since the fruit velocity is checked by flap 40 and the individual pieces are projected either against the yielding fabric of the bag 17 or onto fruit maintained at a level but slightly below the flexible lip 41. The bin is rotated by chain 31, distributing the fruit evenly around the periphery of the bag 17 and carrying it from the feed spout 39 to the operator. When the quantity of fruit fed to the bin is greater than that removed by the operator, the resulting increase in the weight of fruit in the bin will force downwardly the central upwardly projecting portion of the bottom of bag 17 against the thrust of spring 24, the flexible bag serving to transmit the weight evenly to thrust head 19. Spring 24 is of appropriate design and strength to yield in proportion to the increase in weight of fruit contained in the bag, thereby providing a corresponding increase in capacity of the bin so that the fruit level adjacent the periphery of the bin remains substantially constant. When the rate of removal of the fruit by the operator exceeds the rate of supply, the resulting diminution of the total weight of fruit in the bin will result in an upward movement of thrust head 19 through the action of spring 24, correspondingly reducing the capacity of the bin and automatically maintaining the fruit level.

Furthermore, by this operation, the central portion of the bag bottom adjacent the thrust head 19 constitutes an upward projection with sloping surfaces which displace outwardly a certain amount of the fruit, the extent of such displacement varying according to changes in elevation of said head. The diameter of said projection that is effective in displacing the fruit, increases as said head rises, and even when head 19 is above the fruit level the diameter of the effective portion of the bag bottom projection, located below the fruit level, will increase and decrease in accordance with changes in the elevation of head 19. Furthermore, the general upward projection of the bag bottom imparts to the bin the form of an annular trough; and as head 19 rises, the inner wall of such trough moves upwardly and outwardly, thereby reducing the width and capacity of the trough.

It will therefore be apparent that by the very simple expedient of employing a flexible bag and urging upwardly a central portion thereof, the capacity of the bin is decreased within relatively wide limits by displacement of the fruit in a general radial direction through upward movement of the bag bottom, through increase in the effective diameter of the projecting portion of the bottom, and by decrease in the size of the trough formed by such projection. The capacity of the bin is likewise increased on the same principles by downward movement of the thrust head 19.

In this way the fruit is urged toward the periphery of the bin so that a supply is maintained within ready reach of the operative.

The invention provides a bin that may be constructed and repaired cheaply and readily, and which may be replaced very rapidly at relatively low cost. The bin is free to conform to the fruit without coming in contact with rigid structures except at the center and the periphery of the bin, at points never reached by the fruit itself.

The invention is especially adapted for the handling of fruit, such as oranges, grapefruit and other citrus fruits, but it may also be used with other fruits, vegetables and similar plant products which are generally referred to herein, for convenience, as fruit. Certain features of the invention are moreover applicable to apparatus for the handling of other types of articles or bulk material.

The specific embodiment of the invention described herein may be substantially varied within the scope of the invention as set forth in the claims, and is intended to be illustrative rather than restrictive.

What is claimed is:

1. A supply bin for holding articles such as fruit and the like, comprising a bag made of flexible material and arranged to surround the fruit, means for holding the outer margin of said bag at a predetermined level, and vertically movable means for holding a central portion of said bag at different levels relative to that of said outer margin.

2. A supply bin for holding articles such as fruit and the like, comprising a bowl-shaped bag made of flexible material, means for holding the outer margin of said bag at a predetermined level, said margin-holding means including supports arranged below the said predetermined level, and vertically movable means for holding a central portion of said bag at different levels relative to that of said outer margin.

3. A supply bin for holding articles such as fruit and the like, comprising a bag made of flexible material, means for holding the outer margin of said bag at a predetermined level, and vertically movable resilient means for holding a central portion of said bag at different levels relative to that of said outer margin, said resilient holding means being constructed to adjust itself vertically in accordance with the weight of articles in the bag.

4. A supply bin for holding articles such as fruit and the like, comprising a bag of flexible material, means for holding the outer margin of the bag at a predetermined level, a vertically movable plunger below the bag and having a head attached to a central portion of the bottom of the bag, said plunger having a vertical range of movement greater than the depth of the bag, and a spring arranged to respond to differences in total weight of articles in the bag and thereby to hold said head at different levels relative to the predetermined level of the margin of the bag.

5. A supply bin comprising a base having an erect tubular standard, a tubular sleeve rotatable in said standard and carrying a plurality of arms, a ring carried by said arms, a bag of flexible material having its margin carried by said ring, a thrust member slidable in said tubular sleeve and engaging the bag bottom, and means for retaining the thrust member at various elevations.

6. A supply bin comprising a base having an erect tubular standard, a tubular sleeve rotatable in said standard and carrying a plurality of arms, a ring carried by said arms, a bag of flexible material having its margin carried by said ring, a thrust member slidable in said tubular sleeve and engaging the bag bottom, means for retaining the thrust member at various elevations, and means for rotating the tubular sleeve within the tubular standard.

7. A supply bin comprising a base having an erect tubular standard, a tubular sleeve rotatable in said standard and carrying a plurality of arms, a ring carried by said arms, a bag of flexible material having its margin carried by said ring, a thrust member slidable in said tubular sleeve and engaging the bag bottom, means for retaining the thrust member at various elevations, a driving wheel loosely mounted on said sleeve, a flange fixed to said sleeve, and provided with a lug, and a pawl carried by the driving wheel and arranged to engage the lug in one direction of movement.

WALTER LOWELL WAGGONER.